United States Patent [19]

Shibazaki et al.

[11] 4,244,933

[45] Jan. 13, 1981

[54] CALCIUM CARBONATE PARTICLES AND PROCESSES FOR PREPARING SAME

[75] Inventors: Hiroji Shibazaki, Takarazuka; Setsuji Edagawa, Nishinomiya; Hisashi Hasegawa, Nishinomiya; Satoshi Kondo, Nishinomiya, all of Japan

[73] Assignee: Shiraishi Kogyo Kaisha, Ltd., Amagasaki, Japan

[21] Appl. No.: 23,962

[22] Filed: Mar. 26, 1979

[30] Foreign Application Priority Data

Apr. 5, 1978 [JP] Japan .................................. 53-40668
Jun. 9, 1978 [JP] Japan .................................. 53-69971

[51] Int. Cl.³ .......................... C01F 5/24; C01F 11/18
[52] U.S. Cl. .................................. 423/430; 106/306; 423/432
[58] Field of Search ........................ 423/432; 106/306

[56] References Cited

U.S. PATENT DOCUMENTS

| | | | |
|---|---|---|---|
| 1,372,193 | 3/1921 | Roon | 423/432 |
| 2,538,802 | 1/1951 | Schur | 423/432 |
| 3,133,824 | 5/1964 | Podschus | 423/432 |
| 4,018,877 | 4/1977 | Woode | 423/432 |
| 4,124,688 | 11/1978 | Shibazaki et al. | 423/432 |
| 4,133,894 | 1/1979 | Shibazaki et al. | 423/432 |
| 4,157,379 | 6/1979 | Arika et al. | 423/432 |

*Primary Examiner*—O. R. Vertiz
*Assistant Examiner*—Gary P. Straub
*Attorney, Agent, or Firm*—Bierman & Bierman

[57] ABSTRACT

The invention provides calcium carbonate particles comprising a core and projections formed thereon, and process for preparing same. The calcium carbonates of this invention are useful as fillers and pigments for rubbers, plastics, papers, etc. because of their peculiar configuration and unique properties.

23 Claims, No Drawings

CALCIUM CARBONATE PARTICLES AND PROCESSES FOR PREPARING SAME

This invention relates to calcium carbonate particles of peculiar shape and processes for preparing the same.

Non-cubic calcium carbonate particles are commercially produced presently by the following processes:

(a) Process in which a carbon dioxide-containing gas is forced into an aqueous suspension of fine cubic crystals of calcium carbonate less than 0.1 μm in average size and calcium hydroxide to agglomerate the cubic calcium carbonate crystals into particles resembling rice grains and at least 0.1 μm in average size.

(b) Process for producing particles of heavy calcium carbonate at least 1 μm in average size by grinding limestone.

(c) Process for producing spindle-shaped calcium carbonate particles at least 1 μm in average size by slowly forcing a carbon dioxide-containing gas into an aqueous suspension of calcium hydroxide at room temperature.

(d) Process for producing needle- to pillar-like calcium carbonate particles at least 1 μm in average size by slowly forcing a carbon dioxide-containing gas into an aqueous suspension of calcium hydroxide at a high temperature of about 80° C.

(e) Process for producing chain particles of calcium carbonate by forcing a carbon dioxide-containing gas into an aqueous suspension of calcium hydroxide to convert 15 to 30% of the calcium hydroxide into calcium carbonate, adding to the resulting consistent mixture a zinc salt which converts to zinc hydroxide on hydrolysis and forcing the carbon dioxide-containing gas into the mixture (Published Examined Japanese Patent Application No. 519/1962).

These calcium carbonate particles have various drawbacks. For instance, they are very inferior as paper coating pigments in giving gloss to the plain surface or printing surface of paper or in affording pick strength. The spindle-shaped, needle- or pillar-like particles of calcium carbonate having an aspect ratio of about 2 to about 10 and used as fillers for giving rigidity or stiffness to plastics, rubbers and papers are still unable to impart the desired property to the matrixes of these materials. Although the chain particles are as large as about 5 to about 50 in apparent aspect ratio, they fail to exhibit sufficient rigidity within the matrix since the chain is liable to cleave when subjected to impact resulting in a reduced aspect ratio.

Accordingly the main object of this invention is to overcome the foregoing drawbacks and provide calcium carbonate particles of novel shape.

Another object of the invention is to provide calcium carbonate particles of novel shape having outstanding properties for use as paper coating pigments.

Another object of the invention is to provide calcium carbonate particles of novel shape useful as fillers for imparting enhanced rigidity to plastics, rubbers, papers and like materials.

Still another object of the invention is to provide a process for producing such calcium carbonate particles of novel shape.

Other objects and features of this invention will become more apparent from the following description.

The present invention provides a calcium carbonate (hereinafter referred to as "calcium carbonate A") in the form of particles comprising a core about 0.5 to about 6.5 μm in average size and about 100 to about 4000 projections formed on the surface of the core and having a length (L) of about 0.25 to about 2.00 μm, a diameter (D) of about 0.08 to about 0.20 μm and as aspect ratio (L/D) of about 3 to about 10, the calcium carbonate A having a void volume of about 1.0 to about 1.8 ml/g and an oil absorption of about 45 to about 60 ml/100 g. The invention also provides a process for preparing the calcium carbonate A.

The invention further provides a calcium carbonate (hereinafter referred to as "calcium carbonate B") in the form of particles comprising a core about 0.2 to about 2.0 μm in average size and about 100 to about 4000 projections formed on the surface of the core and having a length (L) of about 0.15 to about 4.00 μm, a diameter (D) of about 0.05 to about 0.20 μm and an aspect ratio (L/D) of about 3 to about 20, the calcium carbonate B having a void volume of about 1.8 to about 3.3 ml/g and an oil absorption of about 50 to about 100 ml/g. The invention also provides a process for preparing the calcium carbonate B.

The term "core" as used in this specification refers to a spherical, ellipsoidal or egg-shaped body, a cube or rectangular parallelepiped having round corners and ridges, or a block resembling such body. The core may have a sponge-like porous structure in its interior. By the term "average diameter of the core" is meant the diameter of a sphere having the same volume as the core. By the term "average diameter of the projection" is meant the diameter of a cylinder identical with the projection in length and volume.

We have conducted research on a process for producing calcium carbonate comprising the first step of spraying an aqueous suspension of calcium hydroxide into a reactor from its top in countercurrent relation to a carbon dioxide-containing gas passed upward through the reactor to convert part of the calcium hydroxide to calcium carbonate, the second step of spraying the resulting mixture into another reactor from its top in countercurrent relation to a carbon dioxide-containing gas passed upward through the reactor to promote the carbonation of the calcium hydroxide, and the third step of spraying the mixture resulting from the second step into another reactor from its top in countercurrent relation to a carbon dioxide-containing gas passed upward through the reactor to complete the carbonation of the calcium hydroxide. Consequently we have found that particles of the calcium carbonate A having projections can be prepared when the reaction of the first step or the second step is conducted in the presence of at least one of phosphoric acid and water-soluble salts thereof. We have further found that particles of the calcium carbonate B having projections can be prepared by a process comprising the first step of spraying an aqueous suspension of calcium hydroxide into a reactor from its top in countercurrent relation to a carbon dioxide-containing gas passed upward through the reactor to convert part of the calcium hydroxide to calcium carbonate, the suspension containing at least one specific carboxyl-containing compound, and the second step of spraying the resulting mixture into another reactor from its top in countercurrent relation to a carbon dioxide-containing gas passed upward through the reactor to complete the carbonation of the calcium hydroxide. We have further found that the calcium carbonates A and B having a novel configuration heretofore unknown are of very useful properties substantially free of the foregoing drawbacks of the existing calcium carbonate particles. This invention has been accomplished based on these novel findings.

The calcium carbonate A and calcium carbonate B will be described below.

Calcium Carbonate A

Observation under an electron microscope has revealed that particles of the calcium carbonate A have a peculiar shape that a block-like core is provided with a large number of projections over the periphery thereof. Since the projections have no portions which are joined together or connected in the form of a chain longitudinally thereof, the projections per se have exceedingly high strength, and the particles are also tough in themselves. Accordingly even when the calcium carbonate A is treated for example by a pulverizer of the impact type, projections may be fractured partially but the cores will remain intact.

The calcium carbonate A of this invention generally has the chemical composition given in Table 1 and the physical properties listed in Table 2 which also shows those of known calcium carbonates.

TABLE 1

| CaO | 53.5–55.4 | % by weight |
|---|---|---|
| $P_2O_5$ | 0.007–3.5 | % by weight |
| Ig. loss | 43–44 | % by weight |
| Miscellaneous | 0.02–0.7 | % by weight |

TABLE 2

| | Calcium carbonate A | Commercial calcium carbonate | | |
|---|---|---|---|---|
| | | I[1] | II[2] | III[3] |
| Shape of particles | With projections | Needle-like | Cubic | Indefinite |
| Projections | | | | |
| Number | 100–4000 | — | — | — |
| Length (L,$\mu$m) | 0.25–2.00 | — | — | — |
| Diam. (D,$\mu$m) | 0.08–0.20 | — | — | — |
| Aspect ratio (L/D) | 3–10 | — | — | — |
| Water absorption (g/g) | 0.07–1.20 | 1.29 | 1.02 | 0.5 |
| Angle of repose (deg) | 30–40 | 37 | 46 | 46 |
| Specific surface area ($m^2/g$) | 5–15 | 4.0 | 26.0 | 2.5 |
| Oil absorption (ml/100 g) | 45–60 | 40 | 27 | 20 |
| Void volume (ml/g) | 1.0–1.8 | 1.00 | 1.10 | 0.60 |
| Sedimentation volume (ml/60 min) | 20–50 | 18 | 95 | 12 |
| Hiding power ($cm^2/g$) | 25–33 | 21.0 | 13.8 | 13.9 |
| Viscosity (cps/60 wt. %) | 20–100 | 74 | 3800 | 26 |

Note:
[1] Light calcium carbonate,
[2] Colloidal calcium carbonate,
[3] Ground calcium carbonate.

The physical properties listed in Table 2 et seq. are determined by the following methods.

(1) The number, length and diameter of projections: Measured under an electron microscope.

(2) Water absorption: A water absorption measuring device is placed with its base positioned horizontally. A specimen container provided at its bottom with a sheet of filter paper 43 mm in diameter is fitted into a recess in the base with an intermediate cylinder fitted in the container. A specified quantity of the specimen weighed out on an even balance is placed into the container through the cylinder and levelled over the surface. The piston of the device is quietly inserted into the container along the inner surface of the cylinder and pressed against the specimen. With the piston held in its inserted position, the cylinder is removed from the base, and the container with the specimen therein is also removed from the base and then weighed on the even balance. The weight measured is assumed to be $X_1$. Subsequently the specimen container is quietly placed into a glass dish filled with water to a depth of 4 mm. Ten minutes after the specimen has been wetted with the water over the entire surface, the container is withdrawn from the dish and allowed to stand for 5 minutes on 5 superposed sheets of filter paper. Immediately after the water has been wiped off from the bottom and side surface of the container with filter paper, the container is weighed. The weight measurement is assumed to be $X_2$, and the amount of water absorbed by the bottom filter paper, a constant value of 0.3 g. The water absorption is calculated from the following equation down to the second decimal place.

$$\text{Water absorption (g/g)} = \frac{(X_2 (g) - X_1 (g)) - 0.3 (g)}{\text{Weight of specimen (g)}}$$

(3) Angle of repose: The specimen is poured onto a disk having a diameter (D=80 mm) through a funnel positioned above the disk concentrically therewith to form a conical accumulation of the specimen. The height (H mm) of the cone is measured. The angle of repose, $\theta$, is given by $\tan \theta = 2H/D = 2H/80$.

(4) Specific surface area: According to the BET method using $N_2$.

(5) Oil absorption: According to JIS K 5101.

(6) Void volume: Measured by a mercury porosimeter.

(7) Hiding power: According to JIS K 5101.

(8) Sedimentation volume: A 5-gram quantity of the specimen is placed into a 100-ml measuring cylinder, and water is added to the specimen to obtain 100 ml of a mixture. The sedimentation volume is measured after shaking the mixture for 20 seconds and allowing the same to stand for 60 minutes.

(9) Viscosity: A commercial sodium polyacrylate dispersant (0.5 part by weight) is added to 100 parts by weight of 60% by weight aqueous dispersion of the specimen, and the viscosity of the mixture is measured by Brookfield type viscosimeter at 60 r.p.m. A 50% by weight aqueous suspension is used for the commercial product II which is highly viscous.

Table 2 indicates that the calcium carbonate A of this invention is very useful as a pigment for coating papers and other articles and a filler for making papers and plastics materials.

The calcium carbonate A of this invention is prepared by the following processes.

(i) An aqueous calcium hydroxide suspension is prepared which has a concentration of about 5 to about 15% by weight and contains at least one of phosphoric acid and water-soluble salts thereof in an amount of about 0.01 to about 5.0 parts by weight, calculated as $P_2O_5$, per 100 parts by weight of the calcium hydroxide. The phosphoric acid may be any of orthophosphoric acid, metaphosphoric acid, hexametaphosphoric acid, tripolyphosphoric acid, pyrophosphoric acid, tetrapolyphosphoric acid, hexapolyphosphoric acid, etc. The water-soluble salt may be any of sodium, potassium, zinc and like salts of these phosphoric acids. The suspension is sprayed into a reactor in the form of droplets about 0.2 to about 1.0 mm in diameter at a temperature of about 30° to about 80° C. in countercurrent relation to a carbon dioxide-containing gas which is passed upward through the reactor at a superficial velocity of about 0.02 to about 1.0 m/sec to convert about 5 to about 25% of the calcium hydroxide to calcium carbonate and produce uniform crystals in the form of bundled threads and servings as bases for the desired particles of calcium carbonate to be obtained. When less than 0.01 parts by weight, calculated as $P_2O_5$, of the phosphoric acids and water-soluble salts thereof are used in the first step per 100 parts by weight of the calcium hydroxide, the calcium carbonate particles finally obtained will not have satisfactory projections, whereas when the amount exceeds 5.0 parts by weight, the resulting product will contain particles other than those having projections. It is more preferable to use the phosphoric acids and water-soluble salts thereof in an amount of about 0.02 to about 3.0 parts by weight, calculated as $P_2O_5$, per 100 parts by weight of the calcium hydroxide. If the aqueous suspension has a calcium hydroxide concentration of less than 5% by weight or a temperature of lower than 30° C., the calcium carbonate finally obtained will be in the form of chain particles or of block-like secondary particles which are agglomerates of fine cubic particles of up to 0.1 μm. If the calcium hydroxide concentration is above 15% by weight, difficulty is encountered in spraying the suspension in uniform droplets, giving a final product in particle sizes of reduced uniformity. When the temperature is higher than 80° C., there is a pronounced tendency that the product will contain large particles of undesirable shape. When the suspension is sprayed in droplets of larger than 1.0 mm in diameter, the reaction fails to proceed uniformly, giving a final product in uneven particle sizes, whereas droplets smaller than 0.2 mm tend to flow out from the reactor as entrained in the carbon dioxide-containing gas. The carbon dioxide-containing gas, if passed through the reactor at a superficial velocity of lower than 0.02 m/sec, will not permit the reaction to proceed smoothly, whereas velocities higher than 1.0 m/sec tend to permit droplets of the suspension to flow out from the system. The carbon dioxide concentration of the gas, although not particularly limited, is likely to impede rapid reaction when below 10% by volume, while concentrations above 40% by volume will not noticeably favor the reaction. In view of reactivity and economy, it is more preferable that the carbon dioxide concentration be about 20 to about 35% by volume.

(ii) In the second step, the mixture resulting from the first step is sprayed into a second reactor in droplets of about 1.0 to about 2.0 mm in diameter at a temperature of about 30° to about 80° C. in countercurrent relation to a carbon dioxide-containing gas passed upward through the reactor at a superficial velocity of about 0.5 to about 2.5 m/sec to effect the carbonation to about 95 to about 98%, whereby the crystals produced in the first step and resembling bundles of threads are gathered into portions substantially corresponding to the cores of the final product. The second-step reaction is carried out substantially under the same conditions as in the first step. Since the bundled thread-like crystals have already been formed in the first step, the mixture is sprayed in larger droplets, with the gas passed at a correspondingly higher superficial velocity.

(iii) In the third step, the mixture from the second step is sprayed into a third reactor at a temperature of about 30° to about 80° C. in droplets of about 1.5 to about 2.0 mm in diameter in countercurrent relation to a carbon dioxide-containing gas which is passed upward through the reactor at a superficial velocity of about 1.5 to about 3.0 m/sec to complete the carbonation. The reaction affords calcium carbonate A in the form of particles comprising a core and projections formed over the surface of the core. Since the third step needs only to complete the carbonation which has already proceeded greatly, the mixture from the second step is sprayed in slightly larger droplets with the carbon dioxide-containing gas fed also at an increased superficial velocity while other conditions are substantially the same as in the first step reaction. The calcium carbonate A produced according to this invention is collected from the reaction mixture in a usual manner as by a filter press, vacuum filter or the like, dried, divided into loose particles and classified to obtain particles of desired size.

The calcium carbonate A of this invention can be produced also by conducting the first step with use of an aqueous suspension containing about 5 to about 15% by weight of calcium hydroxide, adding at least one of the above-specified phosphoric acids and water-soluble salts thereof to the mixture resulting from the first step in an amount of about 0.01 to about 5.0 parts by weight, calculated as $P_2O_5$, per 100 parts by weight of the solids and subsequently performing the second and third steps. This process may be practiced under the same conditions as above with the exception of when to add the phosphoric compound.

Calcium Carbonate B

Observation under an electron microscope has revealed that the particles of the calcium carbonate B comprise a block-like core having a large number of projections formed over the periphery thereof. Since the projections have no portions which are joined together or connected in the form of a chain longitudinally thereof, the projections per se have exceedingly high strength, and the particles are also tough in themselves. Accordingly even when the calcium carbonate B is treated for example by a pulverizer of the impact type, projections may be fractured partially but the cores will remain intact.

The calcium carbonate B of this invention generally has the chemical composition given in Table 3 and the physical properties listed in Table 4 which also shows those of known calcium carbonates.

TABLE 3

| CaO | 48.5–55.4 | % by weight |
|---|---|---|
| Ig. loss | 43.0–51.0 | % by weight |
| Miscellaneous | 0.02–0.7 | % by weight |

TABLE 4

| | Calcium carbonate B | Commercial calcium carbonate | | |
| --- | --- | --- | --- | --- |
| | | I[1] | II[2] | III[3] |
| Shape of particles | With projections | Needle-like | Cubic | Indefinite |
| Projections | | | | |
| Number | 100–4000 | — | — | — |
| Length (L,μm) | 0.15–4.0 | — | — | — |
| Diam. (D,μm) | 0.05–0.2 | — | — | — |
| Aspect ratio (L/D) | 3–20 | — | — | — |
| Water absorption (g/g) | 1.0–2.3 | 1.29 | 1.02 | 0.57 |
| Angle of repose (deg) | 45–60 | 37 | 46 | 46 |
| Specific surface area (m$^2$/g) | 8–20 | 4.0 | 26.0 | 2.5 |
| Oil absorption (ml/100 g) | 50–100 | 40 | 27 | 20 |
| Void volume (ml/g) | 1.8–3.3 | 1.00 | 1.10 | 0.60 |
| Sedimentation volume (ml/60 min) | 50–70 | 18 | 95 | 12 |
| Hiding power (cm$^2$/g) | 30–50 | 21.0 | 13.8 | 13.9 |
| Viscosity (cps/60 wt. %) | 100–1000 | 74 | 3800 | 26 |

Note:
[1] Light calcium carbonate.
[2] Colloidal calcium carbonate.
[3] Ground calcium carbonate.

Table 4 indicates that the calcium carbonate B of this invention is highly amenable to absorption of oil and to sedimentation, has a large void volume and high rigidity and is therefore very useful as a filler and pigment for plastics, rubbers, papers and like materials.

The calcium carbonate B of this invention is prepared by the following process.

(i) An aqueous suspension is prepared which has a calcium hydroxide concentration of about 5 to about 15% by weight and contains about 0.01 to about 20 parts by weight of at least one additive per 100 parts by weight of the calcium hydroxide, the additive being selected from the group consisting of (a) hydrocarboxylic acids the water-soluble salts thereof, (b) aminopolycarboxylic acids and water-soluble salts thereof, and (c) water-soluble salts of a copolymer of 100 moles of isobutylene and 80 to 150 moles of maleic anhydride. (The copolymer will be hereinafter referred to as "IM copolymer".) Examples of useful hydroxycarboxylic acids are citric acid, tartaric acid and malic acid, and examples of useful water-soluble salts thereof are alkali metal salts and ammonium salts. Examples of useful aminopolycarboxylic acids are iminodiacetic acid, nitrilotriacetic acid and ethylenediaminetetraacetic acid, and examples of useful water-soluble salts thereof are alkali metal salts and ammonium salts. Examples of useful IM copolymers are those usually having a molecular weight of about 10,000 to about 30,000. They are used in the form of water-soluble salts such as alkali metal salts and ammonium salts. IM copolymers lower than 10,000 in molecular weight are difficult to industrially produce, whereas the use of those having a molecular weight of higher than 30,000 will give particles of calcium carbonate with projections having an aspect ratio (L/D) of less than 3, failing to afford the desired calcium carbonate. Examples of more preferable IM copolymers are those prepared by reacting isobutylene with maleic anhydride in the ratio of about 100 to about 120 moles of the latter per 100 moles of the former and having a molecular weight of about 15,000 to about 20,000. The suspension is passed downward through a reactor at a temperature of about 30 to about 80° C. in countercurrent relation to a carbon dioxide-containing gas passed upward through the reactor at a superficial velocity of about 0.02 to about 1.0 m/sec to covert about 5 to about 40% of the calcium hydroxide to calcium carbonate. Insofar as the carbonation is effected to about 5 to about 40%, the suspension can be passed downward through the reactor in any manner as by spraying or by being caused to flow downward through a charging column or column equipped with trays. In view of equipment cost and ease of operation, however, the spray method is desirable. Accordingly the present process will be described below as practiced by the spray method. The suspension is sprayed preferably in droplets of about 0.2 to about 1.0 mm in diameter. When less than 0.01 part by weight of the additive is used in the first step per 100 parts by weight of the calcium hydroxide, the calcium carbonate particles finally obtained will not have satisfactory projections, whereas when the amount exceeds 20 parts by weight, large agglomerates will be finally formed in place of the desired crystalline particles, it is more preferable to use about 0.05 to about 15 parts by weight of the additive per 100 parts by weight of the calcium hydroxide. If the aqueous suspension uhas a calcium hydroxide concentration of less than 5% by weight or a temperature of lower than 30° C., it is more likely that the calcium carbonate finally obtained is in the form of block-like secondary particles which are agglomerates of chain particles. If the calcium hydroxide concentration is above 15% by weight, difficulty is encountered in spraying the suspension in uniform droplets, permitting formation of chain particles and agglomerates of such particles. When the suspension has a temperature of higher than 80° C., there occurs a pronounced tendency that the product will contain large particles, and particles with projections of very small L/D. With droplets larger than 1.0 mm in diameter, the reaction fails to proceed uniformly, whereas droplets smaller than 0.2 mm tend to flow out from the reactor as entrained in the carbon dioxide-containing gas. The carbon dioxide-containing gas, if passed through the reactor at a superficial velocity of lower than 0.02 m/sec, will not permit the reaction to proceed smoothly, whereas velocities higher than 1.0 m/sec tend to permit droplets of the suspension to flow out from the system. The carbon dioxide concentration of the gas, although not particularly limited, is likely to impede rapid reaction when below 10% by volume, while concentrations above 40% by volume will not noticeably favor the reaction. In view of reactivity and economy, it is more preferable that the carbon dioxide concentration be about 20 to about 35% by volume.

(ii) In the second step, the mixture resulting from the first step is sprayed into a second reactor in droplets of about 1.0 to about 2.0 mm in diameter at a temperature of about 30° to about 80° C. in countercurrent relation to a carbon dioxide-containing gas passed upward through the reactor at a superficial velocity of about 1.0 to about 3.0 m/sec to complete the carbonation. Since the reaction has already proceeded, the mixture is sprayed in larger droplets, with the gas passed at a correspondingly higher superficial velocity. The calcium carbonate B produced according to this invention is collected by dewatering the reaction mixture in a usual manner as by a filter press, vacuum filter or the like, drying and dividing the resulting solids into loose particles and classifying the product.

The calcium carbonates A and B of this invention impart outstanding rigidity to matrixes because of their peculiar configuration and, in this respect, they have a unique advantage and are therefore very useful as fillers and pigments for rubbers, plastics, papers, etc. They also have various other applications because of their novel properties.

For a better understanding of the features of this invention, examples are given below in which the concentrations of liquids are in percent by weight, those of gas in percent by volume, and the quantities of the starting materials and products are per hour.

EXAMPLE 1

(i) First Step

To 2500 kg of an aqueous suspension of calcium hydroxide in a concentration of 7.5% is added sodium hexametaphosphate in an amount of 0.8 kg (0.3 part by weight, calculated as $P_2O_5$, per 100 parts by weight of calcium hydroxide), and the mixture is sprayed into a first reactor in droplets of 0.8 mm in diameter at a temperature of 50° C. in countercurrent relation to 40 m³ of a gas containing 30% of carbon dioxide and passed upward through the reactor at a temperature of 30° C. and at a superficial velocity of 1.0 m/sec to effect carbonation to 15% and continuously form uniform crystals in the form of bundles of threads.

(ii) Second Step

The mixture resulting from the first step is sprayed into a second reactor in droplets of 1.4 mm in diameter in countercurrent relation to 220 m³ of a gas containing 30% of carbon dioxide and passed upward through the reactor at a temperature of 30° C. and at a superficial velocity of 2.0 m/sec to cause the carbonation to proceed rapidly to 98%.

(iii) Third Step

The mixture resulting from the second step is sprayed into a third reactor in droplets of 1.6 mm in diameter in countercurrent relation to 20 m³ of a gas containing 30% of carbon dioxide and passed upward through the reactor at a temperature of 30° C. and at a superficial velocity of 2.5 m/sec to complete the carbonation. The reaction mixture is then dewatered by a filter press, dried, broken up and screened. The calcium carbonate A thus prepared according to this invention has the chemical composition listed in Table 5 and the physical properties shown in Table 6. The yield is about 250 kg.

EXAMPLE 2

(i) First Step

To 2000 kg of an aqueous suspension of calcium hydroxide in a concentration of 12% is added sodium tripolyphosphate in an amount of 2.07 kg (1.2 parts by weight, calculated as $P_2O_5$, per 100 parts by weight of calcium hydroxide), and the mixture is sprayed into a first reactor in droplets of 0.5 mm in diameter at a temperature of 60° C. in countercurrent relation to 40 m³ of a gas containing 30% of carbon dioxide and passed upward through the reactor at a temperature of 30° C. and at a superficial velocity of 0.05 m/sec to effect carbonation to 10%.

(ii) Second Step

The mixture resulting from the first step is sprayed into a second reactor in droplets of 1.2 mm in diameter in countercurrent relation to 280 m³ of a gas containing 30% of carbon dioxide and passed upward through the reactor at a temperature of 30° C. and at a superficial velocity of 2.0 m/sec to cause the carbonation to proceed rapidly to 95%.

(iii) Third Step

The mixture resulting from the second step is sprayed into a third reactor in droplets of 1.6 mm in diameter in countercurrent relation to 40 m³ of a gas containing 30% of carbon dioxide and passed upward through the reactor at a temperature of 30° C. and at a superficial velocity of 2.5 m/sec to complete the carbonation. Calcium carbonate is obtained by dewatering the reaction mixture with a filter press, drying the resultant pasty product, dividing the dried solid into particles and screening the same. The calcium carbonate A thus prepared according to this invention has the chemical composition listed in Table 5 and the physical properties shown in Table 6. The yield is about 320 kg.

EXAMPLE 3

(i) First Step

A 2500 kg quantity of an aqueous suspension of calcium hydroxide in a concentration of 7.5% is sprayed into a first reactor in droplets of 0.8 mm in diameter at a temperature of 50° C. in countercurrent relation to 40 m³ of a gas containing 30% of carbon dioxide and passed upward through the reactor at a temperature of 30° C. and at a superficial velocity of 1.0 m/sec to effect carbonation to 15%.

(ii) Second Step

To the mixture resulting from the first step is added sodium hexametaphosphate in an amount of 0.8 kg (0.3 part by weight, calculated as $P_2O_5$, per 100 parts by weight of calcium hydroxide), and the mixture is sprayed into a second reactor in droplets of 1.4 mm in diameter in countercurrent relation to 220 m³ of a gas containing 30% of carbon dioxide and passed upward through the reactor at a temperature of 30° C. and at a superficial velocity of 2.0 m/sec to cause the carbonation to proceed rapidly to 98%.

(iii) Third Step

The mixture resulting from the second step is sprayed into a third reactor in droplets of 1.6 mm in diameter in countercurrent relation to 20 m³ of a gas containing 30% of carbon dioxide and passed upward through the reactor at a temperature of 30° C. and at a superficial velocity of 2.5 m/sec to complete the carbonation. The calcium carbonate thus prepared according to this invention has the chemical composition listed in Table 5 and the physical properties shown in Table 6. The yield is about 250 kg.

COMPARISON EXAMPLE 1

The first to third steps are conducted under the same conditions as in Example 1 except that the first step of Example 1 is carried out at 20° C. Table 6 shows the physical properties of the calcium carbonate obtained.

COMPARISON EXAMPLE 2

The first to third steps are conducted under the same conditions as in Example 2 except that the aqueous dispersion used in the first step of Example 2 is used without any sodium tripolyphosphate added thereto. The calcium carbonate obtained had the physical properties listed in Table 6.

TABLE 5

|  | Example 1 | Example 2 | Example 3 |
|---|---|---|---|
| CaO | 55.3 | 55.2 | 55.3 |
| $P_2O_5$ | 0.2 | 0.4 | 0.2 |
| Ig. loss | 43.9 | 43.8 | 43.9 |
| Miscellaneous | 0.6 | 0.6 | 0.6 |

TABLE 6

|  | Example 1 | Example 2 | Example 3 | Comp. Ex. 1 | Comp. Ex. 2 |
|---|---|---|---|---|---|
| Shape of particles | With projections | With projections | With projections | No projections, block-like | Spindle-shaped |
| Average diam. of particle core (μm) | 1.4 | 2.6 | 1.4 | — | — |
| Projections |  |  |  |  |  |
| Av. length (L,μm) | 0.8 | 1.2 | 1.0 | — | — |
| Av. diam. (D,μm) | 0.10 | 0.12 | 0.10 | — | — |
| Aspect ratio (L/D) | 8 | 10 | 10 | — | — |
| Void volume (ml/g) | 1.23 | 1.35 | 1.28 | 0.90 | 1.05 |
| Specific surface area ($m^2/g$) | 12 | 10 | 11.5 | 8 | 4 |
| Oil absorption (ml/100 g) | 54 | 51 | 53 | 48 | 45 |
| Hiding power ($cm^2/g$) | 29.5 | 27.2 | 29.0 | 21.2 | 20.0 |

EXAMPLE 4

Calcium carbonate A is prepared in the same manner as in Example 1 except that orthophosphoric acid is used in an amount of 0.77 kg (0.3 part by weight, calculated as $P_2O_5$, per 100 parts by weight of calcium hydroxide) in place of 0.8 kg of sodium hexametaphosphate used in the first step of Example 1. Table 7 shows the physical properties of the product.

EXAMPLE 5

Calcium carbonate A is prepared in the same manner as in Example 2 except that metaphosphoric acid is used in an amount of 3.25 kg (1.2 part by weight, calculated as $P_2O_5$, per 100 parts by weight of calcium hydroxide) in place of 2.07 kg of sodium tripolyphosphate used in the first step of Example 2. Table 7 shows the physical properties of the product.

EXAMPLE 6

Calcium carbonate A is prepared in the same manner as in Example 3 except that pyrophosphoric acid is used in an amount of 1.31 kg (0.3 part by weight, calculated as $P_2O_5$, per 100 parts by weight of calcium hydroxide) in place of 0.8 kg of sodium hexametaphosphate used in the second step of Example 3. Table 7 shows the physical properties of the product.

TABLE 7

|  | Example 4 | Example 5 | Example 6 |
|---|---|---|---|
| Shape of particles | With projections | With projections | With projections |
| Average diam. of particle core (μm) | 1.6 | 2.5 | 1.4 |
| Projections |  |  |  |
| Av. length (L,μm) | 0.5 | 0.6 | 0.7 |
| Av. diam. (D,μm) | 0.15 | 0.18 | 0.10 |
| Aspect ratio (L/D) | 3.3 | 3.3 | 7.0 |
| Void volume (ml/g) | 1.20 | 1.21 | 1.23 |
| Specific surface area ($m^2/g$) | 11 | 7 | 12 |
| Oil absorption (ml/100 g) | 52 | 49 | 54 |
| Hiding power ($cm^2/g$) | 29.3 | 27.0 | 30.0 |

COMPARISON EXAMPLE 3

Calcium carbonate particles are prepared in the same manner as in Example 1 except that the sodium hexametaphosphoric acid used in the first step is in an amount of 0.013 kg (0.05 part by weight, calculated as $P_2O_5$, per 100 parts by weight of calcium hydroxide). Table 8 shows the shape of the particles together with the shapes of those obtained in Comparison Examples 4 to 9 given below.

COMPARISON EXAMPLE 4

Calcium carbonate particles are prepared in the same manner as in Example 1 except that the sodium hexametaphosphoric acid used in the first step is in an amount of 17.5 kg (6.5 parts by weight, calculated as $P_2O_5$, per 100 parts by weight of calcium hydroxide).

COMPARISON EXAMPLE 5

Calcium carbonate particles are prepared in the same manner as in Example 1 except that the aqueous suspension used in the first step has a calcium hydroxide concentration of 4% by weight.

COMPARISON EXAMPLE 6

Calcium carbonate particles are prepared in the same manner as in Example 1 except that the aqueous suspension in the first step is used at a calcium carbonate concentration of 20% by weight and in an amount of 1000 kg.

COMPARISON EXAMPLE 7

Calcium carbonate particles are prepared in the same manner as in Example 1 except that the aqueous suspension in the first step is used at a temperature of about 90° C.

COMPARISON EXAMPLE 8

Calcium carbonate particles are prepared in the same manner as in Example 1 except that the suspension in the first step is sprayed in droplets of about 1.5 mm in diameter.

COMPARISON EXAMPLE 9

Calcium carbonate particles are prepared in the same manner as in Example 1 except that the carbon dioxide-containing gas is passed at a superficial velocity of 0.01 m/sec.

COMPARISON EXAMPLE 10

Calcium carbonate particles are prepared in the same manner as in Example 1 except that the suspension used in the first step is sprayed in droplets of about 0.1 mm. The product is substantially comparable to that of Example 1 in shape and properties, but the yield is as low as about 40% of that achieved in Example 1.

COMPARISON EXAMPLE 11

Calcium carbonate particles are prepared in the same manner as in Example 1 except that the carbon dioxide-containing gas is passed at a superficial velocity of 1.5 m/sec. The product is substantially comparable to that of Example 1 in shape and properties, but the yield is as low as about 60% of that achieved in Example 1.

TABLE 8

| Comparison Example | Shape of product |
|---|---|
| 3 | Spindle-shaped |
| 4 | Chain-like |
| 5 | Spindle-shaped and cubic particles in mixture |
| 6 | Block-like agglomerates |
| 7 | Needle-like and spindle-shaped particles in mixture |
| 8 | Block-like agglomerates |
| 9 | Block-like agglomerates |

REFERENCE EXAMPLE 1

Particles of the calcium carbonate (100 parts by weight) prepared in Example 1 and 20 parts by weight of starch oxide are uniformly dispersed into water to prepare a paper coating composition having a solid concentration of 50%. The composition is applied by an applicator bar to one side of uncoated paper in an amount of 20 g/m², dried in air, then stabilized at 20° C. and 60% RH for 24 hours and thereafter treated by a super-calender. Subsequently an ink (trademark: "Fine Ink F Gloss 85 Black", product of Dainippon Ink and Chemicals Inc., Japan) is applied by an RI tester to the paper thoroughly over the entired coated surface. The gloss of the paper is measured both on the plain coated surface and printed surface. The same procedure as above is repeated with use of calcium carbonates produced in Examples 2 and 3 and Comparison Example 2, and commercial calcium carbonate.

TABLE 9

| Calcium carbonate | Gloss (Gs 75%) | |
|---|---|---|
| | Plain surface | Printed surface |
| Example 1 | 23.6 | 61.6 |
| Example 2 | 19.4 | 55.0 |
| Example 3 | 22.3 | 59.0 |
| Comp. Ex. 2 | 19.8 | 25.8 |
| Commercial Calcium Carbonate[1] | 8.4 | 14.9 |

[1]Calcium carbonate produced by mechanically pulverizing limestone to an average particle size of 5 μm and having a specific surface area of 2.5 m²/g as determined by the BET method.

Table 9 indicates the unique nature of the calcium carbonate A of this invention that imparts a subdued gloss to the plain surface but gives the printed surface a high gloss suited for coated paper.

REFERENCE EXAMPLE 2

The calcium carbonate A (50 parts by weight) prepared in Example 1 and 100 parts by weight of polypropylene (trade mark: "Noblen W 101", product of Sumitomo Chemical Company Ltd., Japan) are roll-kneaded at 200° C. for 5 minutes and made into a sheet, which is formed into pellets by a pelletizer. The pellets are shaped into a sheet by injection molding at a temperature of 230° C. The sheet is tested for gloss by a gloss-meter and for tensile strength according to ASTM D-638. The same procedure is repeated, for comparison purposes, with use of commercial calcium carbonate in the form of anisotropic particles having an average size of 3 μm and a specific surface area of 4 m²/g as determined by the BET method. Table 10 shows the results.

TABLE 10

| Calcium carbonate | Gloss (Gs 75%) | Tensil strength (kg/cm²) |
|---|---|---|
| Example 1 | 51 | 385 |
| Commercial calcium carbonate | 54 | 317 |

Table 10 reveals that the calcium carbonate A of this invention gives the resin sheet a matted surface while affording greatly increased tensile strength.

EXAMPLE 7

(i) First Step

To 3000 kg of an aqueous suspension of calcium hydroxide in a concentration of 5% is added 1.8 kg of nitrilotriacetic acid, and the mixture is sprayed into a first reactor in droplets of 0.8 mm in diameter at a temperature of 50° C. in countercurrent relation to 25 m³ of a gas containing 30% of carbon dioxide and passed upward through the reactor at a temperature of 30° C. and at a superficial velocity of 0.05 m/sec to effect carbonation to 10% and form nuclei of crystals.

(ii) Second Step

The mixture resulting from the first step is sprayed into a second reactor in droplets of 1.6 mm in diameter in countercurrent relation to 200 m³ of a gas containing 30% of carbon dioxide and passed upward through the reactor at a temperature of 30° C. and at a superficial velocity of 2.5 m/sec to cause the carbonation to proceed rapidly to completion. The reaction mixture is then dewatered, dried, broken up and screened, giving 200 kg of calcium carbonate B. Table 11-1 below shows the physical properties of the product.

EXAMPLE 8

(i) First Step

To 2500 kg of an aqueous suspension of calcium hydroxide in a concentration of 7.5% is added 10 kg of sodium salt of an IM copolymer (isobutylene: maleic anhydride=100:100, molecular weight about 17,000), and the mixture is sprayed into a first reactor in droplets of 0.8 mm in diameter at a temperature of 40° C. in countercurrent relation to 50 m$^3$ of a gas containing 30% of carbon dioxide and passed upward through the reactor at a temperature of 40° C. and at a superficial velocity of 0.08 m/sec to continuously form nuclei of crystals with carbonation effected to 20%.

(ii) Second Step

The mixture resulting from the first step is sprayed into a second reactor in droplets of 1.8 mm in diameter in countercurrent relation to 230 m$^3$ of a gas containing 30% of carbon dioxide and passed upward through the reactor at a temperature of 40° C. and at a superficial velocity of 2.5 m/sec to cause the carbonation to proceed rapidly to completion. The reaction yields 250 kg of calcium carbonate B. Table 11-1 below shows the physical properties of the product.

COMPARISON EXAMPLE 12

(i) First Step

Ten percent carbonation is effected to form nuclei of crystals in the same manner as in the first step of Example 7 except that the suspension is used at a temperature of 20° C. with 50 m$^3$ of the carbon dioxide-containing gas.

(ii) Second Step

The procedure of the second step, Example 7 is repeated to complete the carbonation and afford 200 kg of a final product, except that 230 m$^3$ of the cabon dioxide-containing gas is used.

The calcium carbonate obtained is in the form of chain particles 1.5 μm in average length, 0.05 μm in average diameter and 30 in average aspect ratio. Table 11-2 shows the physical properties of the product.

COMPARISON EXAMPLE 13

Calcium carbonate (250 kg) is obtained in the same manner as in Example 8 except that the sodium salt of IM copolymer is not used in the first step. Observation under an electron microscope reveals that the product is in the form of spindle-shaped particles 2.0 μm in average length, 0.5 μm in average diameter and 4 in aspect ratio. Table 11-2 shows the physical properties of the product.

EXAMPLE 9

(i) First Step

To 3000 kg of an aqueous suspension of calcium hydroxide in a concentration of 6% is added 5.4 kg of sodium citrate, and the mixture is sprayed into a first reactor in droplets of 0.8 mm in diameter at a temperature of 60° C. in countercurrent relation to 40 m$^3$ of a gas containing 30% of carbon dioxide and passed upward through the reactor at a temperature of 30° C. and at a superficial velocity of 0.6 m/sec to effect carbonation to 30% and form nuclei of crystals.

(ii) Second Step

The mixture resulting from the first step is sprayed into a second reactor in droplets of 1.6 mm in diameter in countercurrent relation to 220 m$^3$ of a gas containing 30% of carbon dioxide and passed upward through the reactor at a temperature of 30° C. and at a superficial velocity of 2.5 m/sec to complete the carbonation, giving 240 kg of a product, the physical properties of which are listed in Table 11-1 below.

TABLE 11-1

|  | Example 7 | Example 8 | Example 9 |
| --- | --- | --- | --- |
| Shape of particles | With projections | With projections | With projections |
| Average diam. of particle core (μm) | 1.0 | 2.0 | 1.8 |
| Projections |  |  |  |
| Av. length (L, μm) | 0.50 | 0.50 | 0.35 |
| Av. diam. (D, μm) | 0.10 | 0.06 | 0.10 |
| Aspect ratio (L/D) | 5.0 | 8.3 | 3.5 |
| Void volume (ml/g) | 1.92 | 3.25 | 2.04 |
| Specific surface area (m$^2$/g) | 10.9 | 16.9 | 9.8 |
| Oil absorption (ml/100 g) | 65 | 75 | 62 |
| Hiding power (cm$^2$/g) | 43 | 38 | 45 |

TABLE 11-2

|  | Comparison Example 12 | Comparison Example 13 | Commercial calcium carbonate[1] |
| --- | --- | --- | --- |
| Shape of particles | Chain crystals | Spindle-shaped | Needle-like |
| Average diam. of particle core (μm) | — | — | — |
| Projections |  |  |  |
| Av. length (L, μm) | — | — | — |
| Av. diam. (D, μm) | — | — | — |
| Aspect ratio (L/D) | — | — | — |
| Void volume (ml/g) | 2.78 | 1.48 | 1.56 |
| Specific surface area (m$^2$/g) | 40.5 | 4.0 | 6.0 |
| Oil absorption (ml/100 g) | 57 | 45 | 40 |
| Hiding power (cm$^2$/g) | 15 | 22 | 21 |

[1] Average length 3.0 μm, average diameter 0.5 μm.

REFERENCE EXAMPLE 3

Particles of the calcium carbonate (100 parts by weight) prepared in Example 7 and 100 parts by weight of polypropylene (trade mark: "Noblen W 101", product of Sumitomo Chemical Company Ltd., Japan) are roll-kneaded at 200° C. for 8 minutes and made into a sheet, which is formed into pellets by a pelletizer. The pellets are shaped into test pieces by injection molding at a temperature of 230° C. The test pieces are tested for various mechanical properties as listed in Table 12, which also shows the corresponding results achieved with the use of the calcium carbonates obtained in Examples 8 and 9, Comparison Examples 12 and 13 and needle-like particles of the commercial calcium carbonate.

Table 12 reveals that the particles of calcium carbonates of this invention give matrixes outstanding mechanical strength.

TABLE 12

| Calcium Carbonate | Izod impact value (kg.cm/cm) | Tensile strength (kg/cm$^2$) | Bending strength (kg/cm$^2$) | Bending elasticity (kg/cm$^2$) |
|---|---|---|---|---|
| Example 7 | 3.0 | 340 | 540 | 43200 |
| Example 8 | 3.2 | 360 | 530 | 42000 |
| Example 9 | 3.0 | 350 | 560 | 43500 |
| Comp.Ex. 12 | 2.3 | 260 | 385 | 24600 |
| Example 13 | 1.8 | 265 | 420 | 33000 |
| Commercial[1] calcium carbonate | 1.9 | 280 | 440 | 33500 |

[1]The same as in Table 11-2.

The physical properties listed in Table 12 are measured by the following methods.
Izod impact value: ASTM D-256
Tensile strength: ASTM D-638
Bending Strength: ASTM D-790
Bending elasticity: ASTM D-790

EXAMPLE 10

Calcium carbonate B is prepared in the same manner as in Example 7 except that 1.8 kg of tartaric acid is used in place of 1.8 kg of nitrilotriacetic acid. Table 13 shows the physical properties of the product together with those of the products obtained in Examples 11 to 13.

EXAMPLE 11

Calcium carbonate B is prepared in the same manner as in Example 7 except that 2.3 kg of sodium malate is used in place of 1.8 kg of nitrilotriacetic acid.

EXAMPLE 12

Calcium carbonate B is prepared in the same manner as in Example 9 except that 5.4 kg of ammonium iminodiacetate is used in place of 5.4 kg of sodium citrate.

EXAMPLE 13

Calcium carbonate B is prepared in the same manner as in Example 9 except that 5.4 kg of sodium ethylenediaminetetraacetate is used in place of 5.4 kg of sodium citrate.

TABLE 13

| | Example 10 | Example 11 | Example 12 | Example 13 |
|---|---|---|---|---|
| Shape of particles | With projections | With projections | With projections | With projections |
| Average diam. of particle core ($\mu$m) | 0.6 | 0.3 | 1.5 | 1.2 |
| Projections | | | | |
| Av. length (L, $\mu$m) | 0.60 | 0.65 | 1.00 | 1.40 |
| Av. diam. (D, $\mu$m) | 0.14 | 0.12 | 0.10 | 0.10 |
| Aspect ratio (L/D) | 4.3 | 5.4 | 10.0 | 14.0 |
| Void volume (ml/g) | 1.89 | 2.05 | 2.14 | 2.36 |
| Specific surface area (m$^2$/g) | 9.8 | 12.1 | 12.1 | 12.8 |
| Oil absorption (ml/100 g) | 63 | 68 | 66 | 70 |
| Hiding power (cm$^2$/g) | 42 | 45 | 44 | 40 |
| Sedimentation volume (ml/60 min) | 53 | 57 | 59 | 62 |

COMPARISON EXAMPLES 14 TO 21

Calcium carbonate particles are prepared in the same manner as in Example 7 except that one of the conditions for the first step of Example 7 is altered as stated below. Table 14 shows the shapes of the particles.

Comparison Example 14: Calcium hydroxide concentration is 4%.
Comparison Example 15: Calcium hydroxide concentration is 20%, with use of 750 kg of the suspension.
Comparison Example 16: 0.005 Parts by weight of nitrilotriacetic acid is used per 100 parts by weight of calcium hydroxide.
Comparison Example 17: 22 Parts by weight of nitrilotriacetic acid is used per 100 parts by weight of calcium hydroxide.
Comparison Example 18: The temperature of the suspension is about 90° C.
Comparison Example 19: The diameter of droplets of the suspension is 1.5 mm.
Comparison Example 20: The diameter of droplets of the suspension is 0.1 mm.
Comparison Example 21: The superficial velocity of the CO$_2$-containing gas is 1.2 m/sec.

TABLE 14

| Comparison Example | Shape |
|---|---|
| 14 | Spindle-shaped crystals, cubic crystals and crystals with projections in mixture |
| 15 | Chain crystals and block-like agglomerates in mixture |
| 16 | Spindle-shaped |
| 17 | Chain particles |
| 18 | Pillar-like and spindle-shaped particles in mixture |
| 19 | Spindle-shaped |
| 20 | Chain particles and block-like agglomerates in mixture |
| 21 | Same as above |

We claim:

1. A process for preparing calcium carbonate particles, said particles comprising a core about 0.5 to about 6.5 $\mu$m in average diameter and about 100 to about 4000 projections formed on the surface of the core and having a length (L) of about 0.25 to about 2.00 $\mu$m, a diameter (D) of about 0.08 to about 0.20 $\mu$m and an aspect ratio (L/D) of about 3 to about 10, the calcium carbonate having a void volume of about 1.0 to about 1.8 ml/g, a specific surface area of about 5 to about 15 m$^2$/g, an an oil absorption of about 45 to about 60 ml/100 g., said process comprising:
(i) the first step of adding to a suspension of calcium hydroxide in a concentration of about 5 to about 15% by weight at least one of phosphoric acids and water-soluble salts thereof in an amount of about 0.01 to about 5.0 parts by weight, calculated as $P_2O_5$, per 100 parts by weight of the calcium hydroxide, and spraying the mixture into a reactor in droplets of about 0.2 to about 1.0 mm in diameter at a temperature of about 30° to about 80° C. in countercurrent relation to a carbon dioxide-containing gas passed upward through the reactor at a superficial velocity of about 0.02 to about 1.0 m/sec, (ii) the second step of spraying the mixture from the first step into another reactor in droplets of about 1.0 to about 2.0 mm in diameter at a temperature of about 30° to about 80° C. in countercurrent relation to a carbon dioxide-containing gas passed upward through the reactor at a superficial velocity of about 0.5 to about 2.5 m/sec, and (iii) the third step of spraying the mixture from the second step into another reactor in droplets of about 1.5 to about 2.0 mm in diameter at a temperature of about 30° to about 80° C. in countercurrent relation to a carbon dioxide-containing gas passed upward through the reactor at a superficial velocity of about 1.5 to about 3.0 m/sec.

2. A process for preparing calcium carbonate particles having projections according to claim 1 wherein said phosphoric acid is at least one species selected from the group consisting of orthophosphoric acid, metaphosphoric acid, hexametaphosphoric acid, tripolyphosphoric acid, pyrophosphoric acid, tetrapolyphosphoric acid and hexapolyphosphoric acid.

3. A process for preparing calcium carbonate particles having projections according to claim 1 wherein said water-soluble salt of phosphoric acid is at least one species selected from the group consisting of sodium, potassium and zinc salts of orthophosphoric acid, metaphosphoric acid, hexametaphosphoric acid, tripolyphosphoric acid, pyrophosphoric acid, tetrapolyphosphoric acid and hexapolyphosphoric acid.

4. A process for preparing calcium carbonate particles having projections according to claim 1 wherein said amount of phosphoric acids and water-soluble salts thereof is about 0.02 to about 3.0 parts by weight, calculated as $P_2O_5$, per 100 parts by weight of the calcium hydroxide.

5. A process for preparing calcium carbonate particles having projections according to claim 1 wherein the carbon dioxide concentration of the gas is not lower than 10% by volume.

6. A process for preparing calcium carbonate particles having projections according to claim 5 wherein the carbon dioxide concentration of the gas is about 20 to about 35% by volume.

7. A process for preparing calcium carbonate particles, said particles comprising a core about 0.5 to about 6.5 μm in average diameter and about 100 to about 4000 projections formed on the surface of the core and having a length (L) of about 0.25 to about 2.00 μm, a diameter (D) of about 0.08 to about 0.20 μm and an aspect ratio (L/D) of about 3 to about 10, the calcium carbonate having a void volume of about 1.0 to about 1.8 ml/g, a specific surface area of about 5 to about 15 m²/g, and an oil absorption of about 45 to about 60 ml/100 g., said method comprising (i) the first step of passing an aqueous calcium hydroxide suspension downward through a reactor at a temperature of about 30° to about 80° C. in countercurrent relation to a carbon dioxide-containing gas passed upward through the reactor at a superficial velocity of about 0.02 to about 1.0 m/sec to convert about 5 to about 40% of the calcium hydroxide to calcium carbonate, the suspension having a calcium hydroxide concentration of about 5 to about 15% by weight and containing about 0.01 to about 20 parts by weight of at least one additive per 100 parts by weight of the calcium hydroxide, the additive being selected from the group consisting of (a) hydroxycarboxylic acids and water-soluble salts thereof, (b) aminopolycarboxylic acids and water-soluble salts thereof and (c) water-soluble salts of a copolymer of 100 moles of isobutylene and 80 to 150 moles of maleic anhydride, and (ii) the second step of passing the mixture from the first step downward through a reactor at a temperature of about 30° to about 80° C. in a countercurrent relation to a carbon dioxide-containing gas passed upward through the reactor at a superficial velocity of about 1.0 to about 3.0 m/sec. to complete the carbonation.

8. A process for preparing calcium carbonate particles having projections according to claim 7 wherein said phosphoric acid is at least one species selected from the group consisting of orthophosphoric acid, metaphosphoric acid, hexametaphosphoric acid, tripolyphosphoric acid, pyrophosphoric acid, tetrapolyphosphoric acid and hexapolyphosphoric acid.

9. A process for preparing calcium carbonate particles having projections according to claim 7 wherein said water-soluble salt of phosphoric acid is at least one species selected from the group consisting of sodium, potassium and zinc salts of orthophosphoric acid, metaphosphoric acid, hexametaphosphoric acid, tripolyphosphoric acid, pyrophosphoric acid, tetrapolyphosphoric acid and hexapolyphosphoric acid.

10. A process for preparing calcium carbonate particles having projections according to claim 7 wherein said amount of phosphoric acids and water-soluble salts thereof is about 0.02 to about 3.0 parts by weight, calculated as $P_2O_5$, per 100 parts by weight of the calcium hydroxide.

11. A process for preparing calcium carbonate particles having projections according to claim 7 wherein the carbon dioxide concentration of the gas is not lower than 10% by volume.

12. A process for preparing calcium carbonate particles having projections according to claim 11 wherein the carbon dioxide concentration of the gas is about 20 to about 35% by volume.

13. A process for preparing calcium carbonate particles, said particles comprising a core about 0.2 to about 2.0 μm in average diameter and about 100 to about 4000 projections formed on the surface of the core and having a length (L) of about 0.15 to about 4.00 μm, and an aspect ratio (L/D) of about 3 to about 20, the calcium carbonate having a void volume of about 1.8 to about 3.3 ml/g, a specific surface area of about 8 to about 20 m²/g, and an oil absorption of about 50 to about 100 ml/100 g, said method comprising:

(i) the first step of passing an aqueous calcium hydroxide suspension downward through a reaction at a temperature of about 30° to about 80° C. in countercurrent relation to a carbon dioxide-containing gas passed upward through the reactor at a superficial velocity of about 0.02 to about 1.0 m/sec to convert about 5 to about 40% of the calcium hydroxide to calcium carbonate, the suspension having a calcium hydroxide concentration of about 5 to about 15% by weight and containing about 0.01 to about 20 parts by weight of at least one additive per 100 parts by weight of the calcium hydroxide, the additive being selected from the group consisting of (a) hydroxycarboxylic acids and water-soluble salts thereof, (b) aminopolycarboxylic acids and water-soluble salts thereof and (c) water-soluble salts of a copolymer of 100 moles of isobutylene and 80 to 150 moles of maleic anhydride, and (ii) the second step of passing the mixture from the first step downward through a reactor at a temperature of about 30° to about 80° C. in a countercurrent relation to a carbon dioxide-containing gas passed upward through the reactor at a superficial velocity of about 1.0 to about 3.0 m/sec. to complete the carbonation.

14. A process for preparing calcium carbonate particles having projections according to claim 13 wherein said additive is at least one species selected from the group consisting of citric acid, tartaric acid and malic acid.

15. A process for preparing calcium carbonate particles having projections according to claim 13 wherein said additive is at least one species selected from the group consisting of alkali metal salts and ammonium salts of citric acid, tartaric acid and malic acid.

16. A process for preparing calcium carbonate particles having projections according to claim 13 wherein said additive is at least one species selected from the group consisting of iminodiacetic acid, nitrilotriacetic acid and ethylenediaminetetraacetic acid.

17. A process for preparing calcium carbonate particles having projections according to claim 13 wherein said additive is at least one species selected from the group consisting of alkali metal salts and ammonium salts of iminodiacetic acid, nitrilotriacetic acid and ethylenediaminetetraacetic acid.

18. A process for preparing calcium carbonate particles having projections according to claim 13 wherein said additive is at least one species selected from the group consisting of alkali metal salts and ammonium salt of copolymer of isobutylene and maleic anhydride.

19. A process for preparing calcium carbonate particles having projections according to claim 13 wherein the suspension in the first step is sprayed into the reactor in droplets of about 0.2 to about 1.0 mm in diameter and the mixture from the first step is sprayed into another reactor in droplets of about 1.0 to about 2.0 mm in diameter.

20. A process for preparing calcium carbonate particles having projections according to claim 13 wherein the carbon dioxide concentration of the gas is not lower than 10% by volume.

21. A process for preparing calcium carbonate particles having projections according to claim 20 wherein the carbon dioxide concentration of the gas is about 20 to 35% by volume.

22. A calcium carbonate in the form of particles comprising a core about 0.5 to about 6.5 $\mu$m in average diameter and about 100 to about 4000 projections formed on the surface of the core and having a length (L) of about 0.25 to about 2.00 $\mu$m, a diameter (D) of about 0.08 to about 0.20 $\mu$m, and an aspect ratio (L/D) of about 3 to about 10, the calcium carbonate having a void volume of about 1.0 to about 1.8 ml/g, a specific surface area of about 5 to about 15 $m^2$/g, and an oil absorption of about 45 to about 60 ml/100 g.

23. A calcium carbonate in the form of particles comprising a core about 0.2 to about 2.0 $\mu$m in average diameter and about 100 to about 4000 projections formed on the surface of the core and having a length (L) of about 0.15 to about 4.00 $\mu$m, and an aspect ratio (L/D) of about 3 to about 20, the calcium carbonate having a void volume of about 1.8 to about 3.3 ml/g, a specific surface area of about 8 to about 20 $m^2$/g, and an oil adsorption of about 50 to about 100 ml/100 g.

* * * * *